(12) United States Patent
Donadille et al.

(10) Patent No.: US 7,937,222 B2
(45) Date of Patent: May 3, 2011

(54) METHOD OF DETERMINING SATURATIONS IN A RESERVOIR

(75) Inventors: Jean-Marc Donadille, Al-Khobar (SA); Alberto Marsala, Bergamo (IT)

(73) Assignees: Schlumberger Technology Corporation, Cambridge, MA (US); Saudi Arabian Oil Company, Dhahran (SA)

( * ) Notice: Subject to any disclaimer, the term of this patent is extended or adjusted under 35 U.S.C. 154(b) by 51 days.

(21) Appl. No.: 12/326,273

(22) Filed: Dec. 2, 2008

(65) Prior Publication Data

US 2010/0132448 A1 Jun. 3, 2010

(51) Int. Cl.
*G01V 11/00* (2006.01)
*E21B 47/00* (2006.01)

(52) U.S. Cl. .... 702/7; 702/11; 166/250.01; 166/250.02; 166/525.3

(58) Field of Classification Search .................. 702/1, 2, 702/6, 7, 9, 11–14, 65, 75, 76, 189, 190; 166/250.02, 336, 250.01, 252.3; 324/338, 324/335, 346
See application file for complete search history.

(56) References Cited

U.S. PATENT DOCUMENTS

| | | | |
|---|---|---|---|
| 6,393,363 | B1 | 5/2002 | Wilt et al. |
| 6,470,274 | B1* | 10/2002 | Mollison et al. ............... 702/7 |
| 6,739,165 | B1 | 5/2004 | Strack |
| 7,340,384 | B2 | 3/2008 | Delhomme et al. |
| 7,363,164 | B2 | 4/2008 | Little et al. |
| 2003/0088391 | A1* | 5/2003 | Delhomme et al. .......... 703/10 |
| 2005/0114029 | A1* | 5/2005 | Clavaud et al. ................ 702/7 |
| 2006/0136135 | A1* | 6/2006 | Little et al. ................... 702/13 |

FOREIGN PATENT DOCUMENTS

| | | |
|---|---|---|
| WO | 0120366 A1 | 3/2001 |
| WO | WO 2006063711 A2 * | 6/2006 |

OTHER PUBLICATIONS

Sainato et al, "Spactial distribution of groundwater salinity at Perfamino-arrecifes zone (Buenos Aires Province, Argentina)", Revista Brasileira de Geofisica, 2006, vol. 24(3), pp. 307-318.
Wilt, M. et al., Crosshole electromagnetic tomography: A new technology for oil field characterization, The Leading Edge, Mar. 1995, vol. 14, Issue 3, pp. 173-177, Society of Exploration Geophysicists.
Wilt, M.J., et al., Crosswell electromagnetic tomography: System design considerations and field results, Geophysics, vol. 60, No. 3, May-Jun. 1995 pp. 871-885, Society of Exploration Geophysicists.
Croucher, A.E., et al., The Henry problem for saltwater instrusion, Water Resources Research, vol. 31, No. 7, Jul. 1995, pp. 1809-1814, American Geophysical Union.

(Continued)

*Primary Examiner* — Michael P Nghiem
*Assistant Examiner* — Ricky Ngon
(74) *Attorney, Agent, or Firm* — Brigid Laffey; James McAleenan; Helene Raybaud

(57) ABSTRACT

A method of determining water saturations from a deep-reading resistivity measurement in a reservoir is provided including the step of estimating, through for example a reservoir simulation process, a spatial distribution of a parameter related to the water conductivity at locations beyond the immediate vicinity of wells penetrating the reservoir and combining the spatial distribution of a parameter related to the water conductivity with a spatial distribution of resistivity as obtained from the deep-reading resistivity measurement to derive a spatial distribution of water saturations at said locations beyond the immediate vicinity of wells, wherein estimation step may be iterative to minimize a mismatch between simulation and measurement.

13 Claims, 4 Drawing Sheets

OTHER PUBLICATIONS

Wilt, M., et al., Using Crosswell Electromagnetics to Map Water Saturation, Society of Petroleum Engineers Western Regional Meeting, Bakersfield, California, Mar. 2001, SPE 68802, pp. 1-6.

Lasswell, P.M., et al., Laboratory Analysis of Electrical Rock Properties And Capillary Pressure In Tight Gas Sands With Low Water Saturations, Canadian Well Logging Society Insite Magazine, vol. 24, Issue 2, pp. 16-25, Jun. 2005.

* cited by examiner

METHOD OF DETERMINING SATURATIONS IN A RESERVOIR

FIELD OF THE INVENTION

This invention is generally related to methods of determining water saturations within a subterranean reservoir based on the evaluation of resistivity surveys of such reservoirs.

BACKGROUND

Considering the different electric resistivity of subterranean hydrocarbons and formation water typically containing salts, resistivity surveys using electromagnetic (EM) fields penetrating into the formation are established as a valuable tool in the hydrocarbon industry. Such EM surveys can be performed to determine for example the presence of hydrocarbon reservoirs in geologic formations or to monitor the shifting positions of hydrocarbons and water during the course of hydrocarbon production and water flooding operations.

To determine the electrical resistivity of geologic formations surrounding and between boreholes drilled into the geologic formations of interest, deep-reading electromagnetic field surveys of subsurface areas typically involve large scale measurements from the surface, including the sea bottom, from surface-to-borehole, and/or between boreholes.

In two articles, "Crosshole electromagnetic tomography: A new technology for oil field characterization", The Leading Edge, March 1995, by Wilt et al. and "Crosshole electromagnetic tomography: System design considerations and field results", Society of Exploration Geophysics, Vol. 60, No. 3, 1995 by Wilt et al., the authors describe the principles guiding the measurement of geologic formation resistivity with low frequency electromagnetic (EM) systems.

Methods and tools for performing EM measurements are further described in a number of patents and patent applications including the co-owned U.S. Pat. No. 6,393,363 to Wilt and Nichols.

In "Using Crosswell Electromagnetic to Map Water Saturation and Formation Structure at Lost Hills". SPE Western Regional Meeting, 26-30 Mar. 2001, Bakersfield, Calif. (SPE paper 68802) by M. Wilt et al., the authors describe a qualitative method of estimating the change in water saturation from time-lapse cross-well EM data.

Published International Patent Application WO2001/020366 provides further background related to reservoir resistivity mapping with deep electromagnetic measurement. It also teaches the combination or joint inversion of resistivity depth images with other geological and geophysical data to estimate the reservoir properties.

The co-owned U.S. Pat. No. 7,363,164 to Little and LaVigne describes Archie and Waxman-Smits laws in the context of using dual and triple water models to interpret electrical resistivity measurements. The modeling of the intrusion of salty water into a medium (Henry problem) is described for example by A. E. Croucher and M. J. O'Sullivan in: 'The Henry problem for saltwater intrusion', Water Resources Research, 31(7), 1995, pp 1809-1814. A solution of this Henry problem is implemented as the so-called 'Groundwater model' within Eclipse™, which is a well-established commercially available reservoir simulation software.

In view of the known art, it is seen as an object of the invention to improve and enhance knowledge of reservoir parameters as gained from deep electromagnetic surveys.

SUMMARY OF INVENTION

According to an aspect of the invention, there is provided a method of determining water saturations from a deep-reading resistivity measurement in a reservoir including the steps of estimating, through preferably a reservoir simulation process, a spatial distribution of a parameter related to the water conductivity at locations beyond the immediate vicinity of wells penetrating the reservoir and combining the spatial distribution of a parameter related to the water conductivity with a spatial distribution of resistivity as obtained from the deep-reading resistivity measurement to derive a spatial distribution of water saturations at the locations beyond the immediate vicinity of wells, wherein the estimation step is preferably iterative to successively minimize a mismatch between simulation and measurement.

A preferred embodiment of the method includes the steps of determining a water saturation distribution within a subterranean reservoir by obtaining a first water saturation distribution derived from simulation of the reservoir using reservoir parameters estimated from prior knowledge of the reservoir, obtaining a second water saturation distribution derived from a resistivity measurement using inversion parameters, and changing one or more of the reservoir or inversion parameters until the first and second water saturation distribution converge within predefined tolerances.

Distributions are understood in the context of this invention as spatial distributions associating a plurality of locations in the reservoir with a respective value of the parameter in question.

A location is understood to be beyond the immediate vicinity of a well if it is beyond the scope of existing logging measurements. Such logging measurements typically determine a formation parameter within a radial distance of 1 m or 2 m from the well. Hence, a location at 5 m or 10 m radial distance from a well or farther are considered to be beyond the vicinity of that well within the scope of the present invention.

The parameter related to the water conductivity can be parameters such as conductivity, resistivity, ion or salt content or any other such parameter on which a determination of conductivity can be based.

The spatial distribution of a parameter related to the water conductivity can be either taken as static for the purpose of determining the water saturation and hence is not changed once determined from the available measurements and prior knowledge. However, in a preferred embodiment of the present invention, the spatial distribution of a parameter related to the water conductivity is recalculated as part of an iterative process.

Prior knowledge of the reservoir can include information derived from seismic measurements, borehole logging measurements, injection history, productions history and other data describing the geology or fluid content of a reservoir. Of particular interest with respect to a preferred embodiment of the invention is information or prior knowledge relating to the salinity or conductivity or any other equivalent parameter characterizing the injected or connate fluids.

In a preferred embodiment, the resistivity measurement is an EM survey including one or more sources and receivers of electromagnetic receivers located during the measurement within or at the boundary of the reservoir. In a variant of this embodiment, the one or more sources and receivers are located in boreholes.

The simulation can be performed by commercially available reservoir simulation programs such as Eclipse™. In a preferred embodiment, the simulation is used to obtain the first water saturation distribution and water salinity or conductivity or any equivalent distribution. In determining such a distribution, use is preferably made of a simulation process which takes into account the mixing of the injected water with connate water in the pore space of the reservoir. Preferred methods of modeling this process are the known solutions to the so-called Henry problem.

Once determined, the water salinity distribution can then serve as input in a step of determining the second water saturation. Such a step involves preferable established relationships between resistivity (or conductivity) and saturations. Examples of such relations are known as Archie-type or Waxman-Smits type relationships.

Alternatively, the invention can be understood as taking a measured resistivity distribution as input and is aimed at estimating the corresponding water saturation (Sw) distribution in the presence of mixed salinities. The mixed salinities occur for example when salinity of the injected water differs from the connate water salinity leading to a initially unknown salt concentration distribution (Csalt). As Csalt is often used in the relationships between resistivity (or conductivity) and saturations relationship, having it as an additional unknown usually prevents a direct conversion of resistivity into water saturation. It is therefore seen as a preferred variant of the invention to determine and update the salt concentration distribution by matching the saturation distribution obtained from resistivity with the saturation distribution independently estimated from a reservoir simulation.

In a preferred embodiment, the water saturation distributions estimated from injection history information and the use of fluid flow through porous medium on one hand and from resistivity information from the inversion of deep EM measurements on the other hand are recalculated iteratively while changing model or other parameters until these two water saturation distributions match. The parameters changed are typically the parameter which the simulation identifies as the most sensitive for reducing the mismatch.

The reservoir simulation software is preferably applied to model the intrusion of injected water into the reservoir in cases where the respective salinities/conductivities of the injected water and the connate water differ. In this variant, the simulation generates a first estimate Sw (denoted as $Sw^E$ in this document) of the saturation and a Csalt distribution. A resistivity distribution Rt obtained from the EM survey and the Csalt distribution obtained from reservoir simulation are preferably converted to another saturation distribution (denoted as $Sw^R$ distribution in this document). Iterations involving changing the parameters used to calculate the initial saturations are performed until the two estimated water saturation distributions agree.

Further details, examples and aspects of the invention will be described below referring to the following drawings.

DETAILED DESCRIPTION

Figure 1:
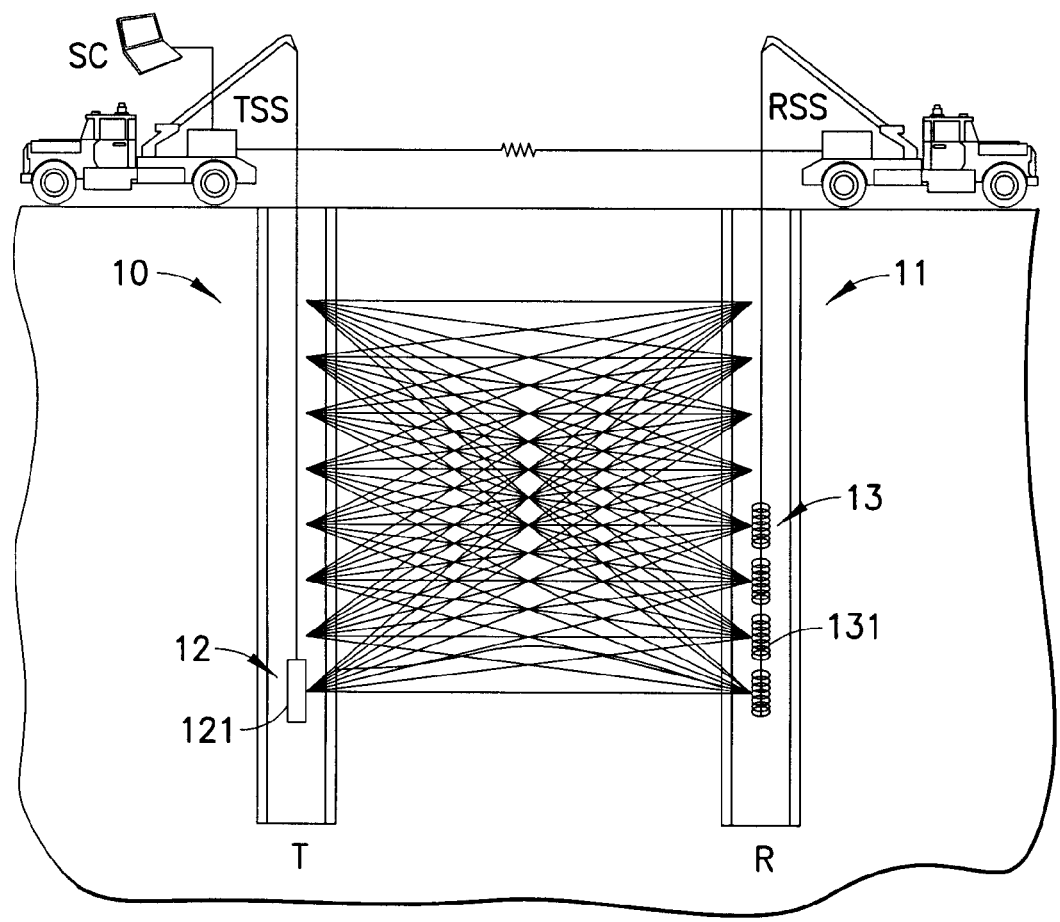
FIG. 1 illustrates an example of an conventional electromagnetic survey operation.

FIG. 1 shows the configuration of equipment used in the measurement of geologic formation resistivity between two boreholes 10, 11. A transmitter 12 is located in one borehole and consists of a coil 121 of $N_T$ turns with an effective cross section $A_T$. The multi-turn loop carries an alternating current $I_T$ at a frequency of $f_0$ Hz.

A corresponding receiver 13 typically includes one or more multi-turn loops of wire, i.e., a coil 131 having $N_R$ turns of wire, wound about a core of high permeability metal or ferrite. The changing magnetic field $B_R$ sensed by the receiver 13 with frequency $f_0$ creates an induced voltage $V_R$ in the coil which is proportional to $B_R$, the frequency $f_0$, the number of turns of wire $N_R$, the effective cross-sectional area of the coil $A_R$, and the effective magnetic permeability of the core of coil 121. Such sensors measure the magnetic field in the direction of the axis of the solenoid.

When this system is placed in a conducting geologic formation the time varying magnetic field $B_0$ produces an electromotive force in the geologic formation, which in turn drives currents therein. These currents are proportional to the conductivity of the geologic formation and are concentric about the longitudinal axis of the borehole. The magnetic field proximate to the borehole is a result of the free space field $B_0$ called the primary magnetic field, and the field from the currents, called the secondary magnetic field. The sum of these fields is a vector and the described sensors thus measure a component of the vector field in the direction of the solenoidal axis.

The secondary magnetic field at the receiver 13 is caused by the induced current and consequently also has a phase shift and so the total field is complex. The total measured field has a component $B_R$ in-phase with the transmitter current $I_T$, (called the real component) and a component $B_I$ phase shifted by 90° (called the imaginary or quadrature component). The values of the real $B_R$ and quadrature components $B_I$ of the magnetic field at a given frequency and geometrical configuration uniquely specify the electrical resistivity of a homogenous formation penetrated by the wellbores 10, 11. In an inhomogeneous geologic formation, the complex field is measured at a succession of points along the longitudinal axis of the receiver borehole for each of a succession of transmitter locations. The multiplicity of T-R locations suffices to determine the inhomogeneous resistivity between the holes at distances from the observer wells of between 10 m to 150 m or more using well-established inversion methods as described in the relevant publications referred to above.

Figure 2:
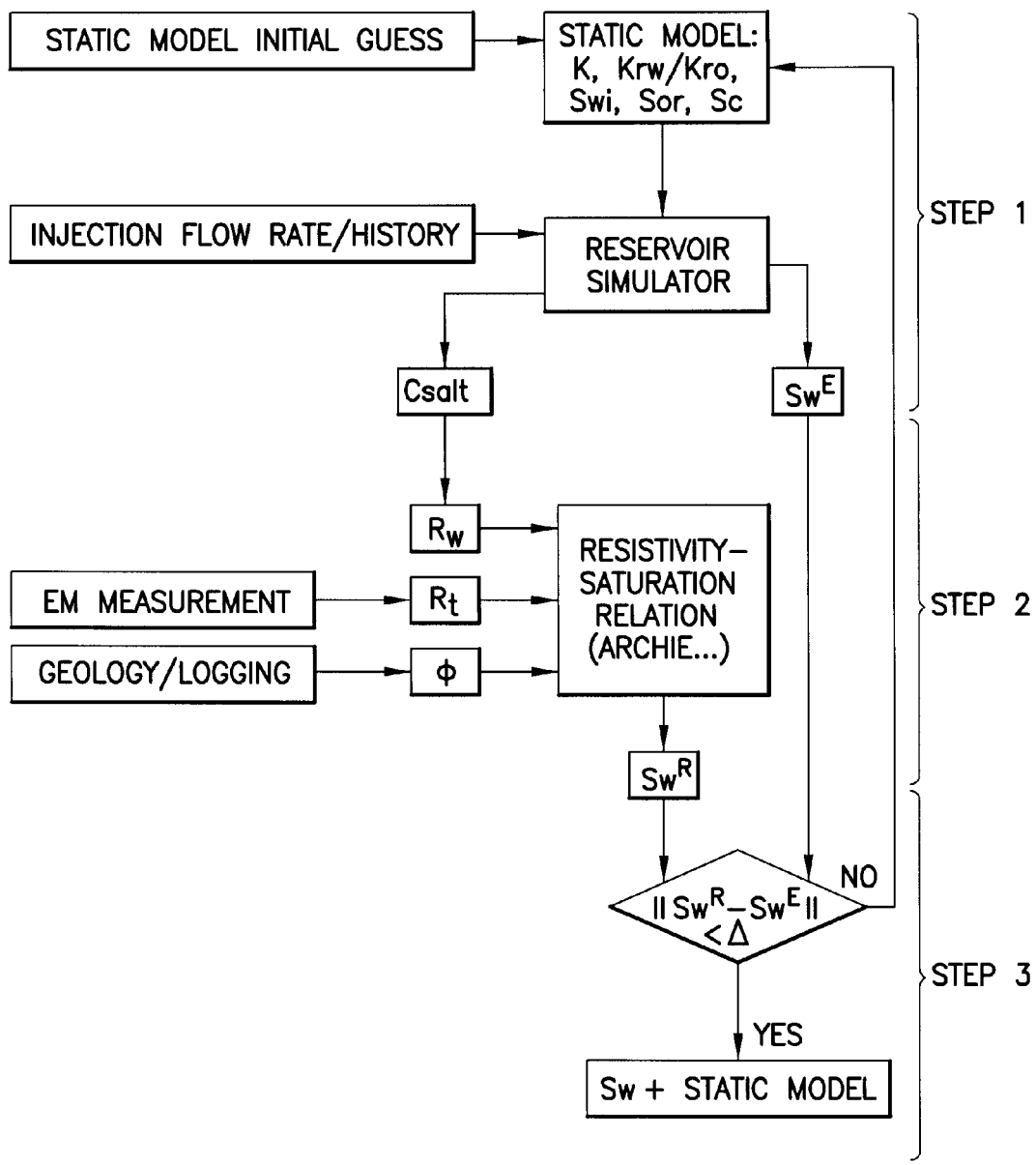
FIG. 2 is a flow chart illustrating steps in accordance with an example of the invention.

While one step of the present example relies on resistivity measurements, a second makes use of established reservoir simulation methods. In the following example of the invention as illustrated by the flowchart of FIG. 2 the following parameter and their respective abbreviation are used:

ϕ: Formation porosity.
K: Permeability
Krw: Relative permeability of water.
Kro: Relative permeability of hydrocarbon.
Swi: Irreducible water saturation.
Sor: Residual oil saturation.
Sc: Connate water saturation.
Sw: Water saturation.
$Sw^E$: Water saturation as predicted directly by running a Reservoir Simulator.
$Sw^R$: Water saturation as predicted by Resistivity/Saturation relationship.
Csalt: salt concentration in the water phase.
Rw: Resistivity of water.
Rt: Formation resistivity.

The flowchart includes three main steps 1, 2 and 3. These steps are described now in more details.

In the first Step 1, there is provided a (initial) static reservoir model and the history of the injected water with salinity that is usually different from the connate water to reservoir simulation software. Such a history can be assumed to be known from the protocols or data of the injection history for the reservoir in question. The injection data typically include pump or flow rates, total volumes, mineral or salt content of the injected water and other parameters. Based on these parameters and further model data K, Krw or Kro, Swi, Sor and Sc, a reservoir simulation software such as the commercially available Eclipse™ and Petrel™ programs can be used to compute a distribution of the salt concentration Csalt in the water phase, and a distribution of the water saturation $Sw^E$ at the time of the deep EM data acquisition.

A preferred method of determining an estimate of the salt concentration Csalt in the water phase, and a distribution of the water saturation $Sw^E$ is based on solving the Henry problem of salty water intrusion. The Henry problem simulates the diffusion of salt and flow of water through porous medium independently. A solver of the Henry problem is part of the Eclipse/Petrel reservoir simulator. Given the Csalt distribution computed in Step 1, in Step 2 a second distribution of water saturation denoted as $Sw^R$ is determined using resistivity measurements Rw and Rt and a relationship which links the resistivity to a second estimate $Sw^R$ of the water saturation in the formation.

A graphical representation of step 2 is illustrated in FIG. 3, which shows pixilated distributions of various parameters. A distribution associates cells or pixels in a computation representation of the reservoir with the calculated or measured value of the parameter in question. Although the distributions represented in FIG. 3 are two-dimensional, the method applies similarly for three-dimensional distributions. All the operations on the distributions are performed pixel-by-pixel. During any inversion process, the simulating program generates a map of gradients, which reflect the sensitivity of the calculated parameters to the input parameters.

Figure 3A:
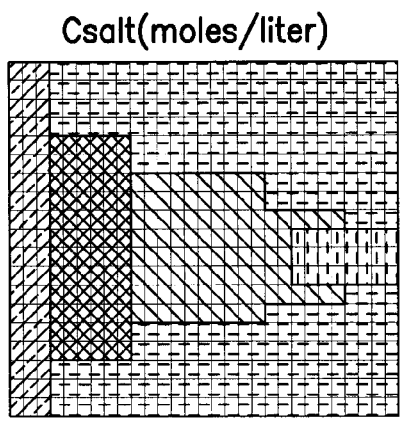
FIG. 3 illustrates a step in accordance with an example of the invention.
Figure 3B:
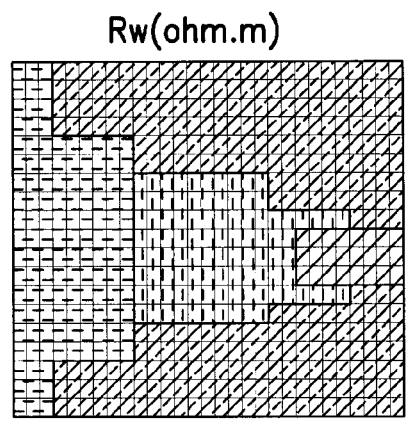

Referring now to FIG. 3a, the example of a distribution of the salt concentration Csalt as computed in Step 1 of FIG. 2 is shown. The values of the distribution are converted into a corresponding distribution of the water resistivity computed from existing tables linking water resistivity and salt concentration at a reservoir temperature. The latter can be either measured using logging measurements or estimated from knowledge of depth and geology. The panel of FIG. 3b shows a map or distribution of the water resistivity Rw.

Figure 3C:
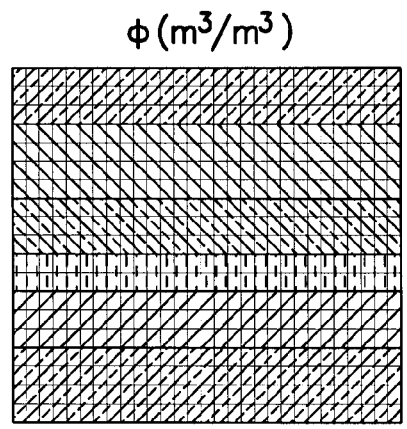

Another input distribution used in this example is a porosity distribution $\phi$ as shown in FIG. 3c. Porosity distributions can be calculated for a reservoir using geostatistics based on well logging data, which are acquired using well-established porosity logging methods and tools.

Figure 3D:
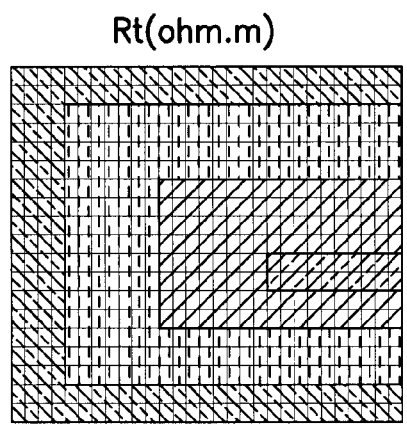

Another input distribution used in this example is a formation resistivity distribution Rt as shown in FIG. 3d. The formation resistivity is the result of standard inversion of a deep EM measurement as described above.

Figure 3E:
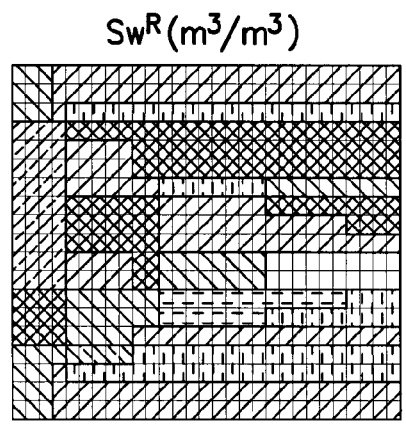

In the present example, the above distributions Rw (or Csalt), $\phi$, Rt are used as inputs for the computation of a corresponding water saturation distribution $Sw^R$ as shown in FIG. 3e.

A Resistivity/Saturation relationship, namely a functional f such that f(Rw, $\phi$, Rt)=Sw, between distributions Rw (or Csalt), $\phi$, Rt and water saturation is typically complex and dependent on the properties of the formation rocks. Extensive work has been done in the past in order to find an appropriate expression of f in various environments such as clastic rocks or carbonate rocks. Some empirical laws have been derived and are routinely used in clastic formations, for example the Archie-type relation $$Sw^n = \Phi^{-m} \frac{Rt}{Rw} \quad [1]$$

or the Waxman-smith type of relation $$\frac{1}{Rt} = \Phi^{m*} Sw^{n*} \left( \frac{1}{Rw} + \frac{B \cdot Qv}{Sw} \right) \quad [2]$$

as can be derived from the article "Laboratory Analysis Of Electrical Rock Properties And Capillary Pressure In Tight Gas Sands With Low Water Saturations" by P. M. Lasswell et al. in: 'Canadian Well Logging Society' magazine, June 2005, Issue 2, Volume 4, p. 16-25.

In other cases, an analysis to determine the appropriate value of certain parameters entering the above functional, such as cementation exponent, saturation exponent, etc., can be conducted on cores taken from wellbores in the reservoir.

If an analytically defined functional relationship is known to be valid or appropriate for a given reservoir, it can be advantageously applied in this step of the example. If however for complex environments such as carbonate formations, none of known functional relationships are deemed to be sufficiently accurate, a relationship f can still be determined by performing several core analysis.

Figure 4:
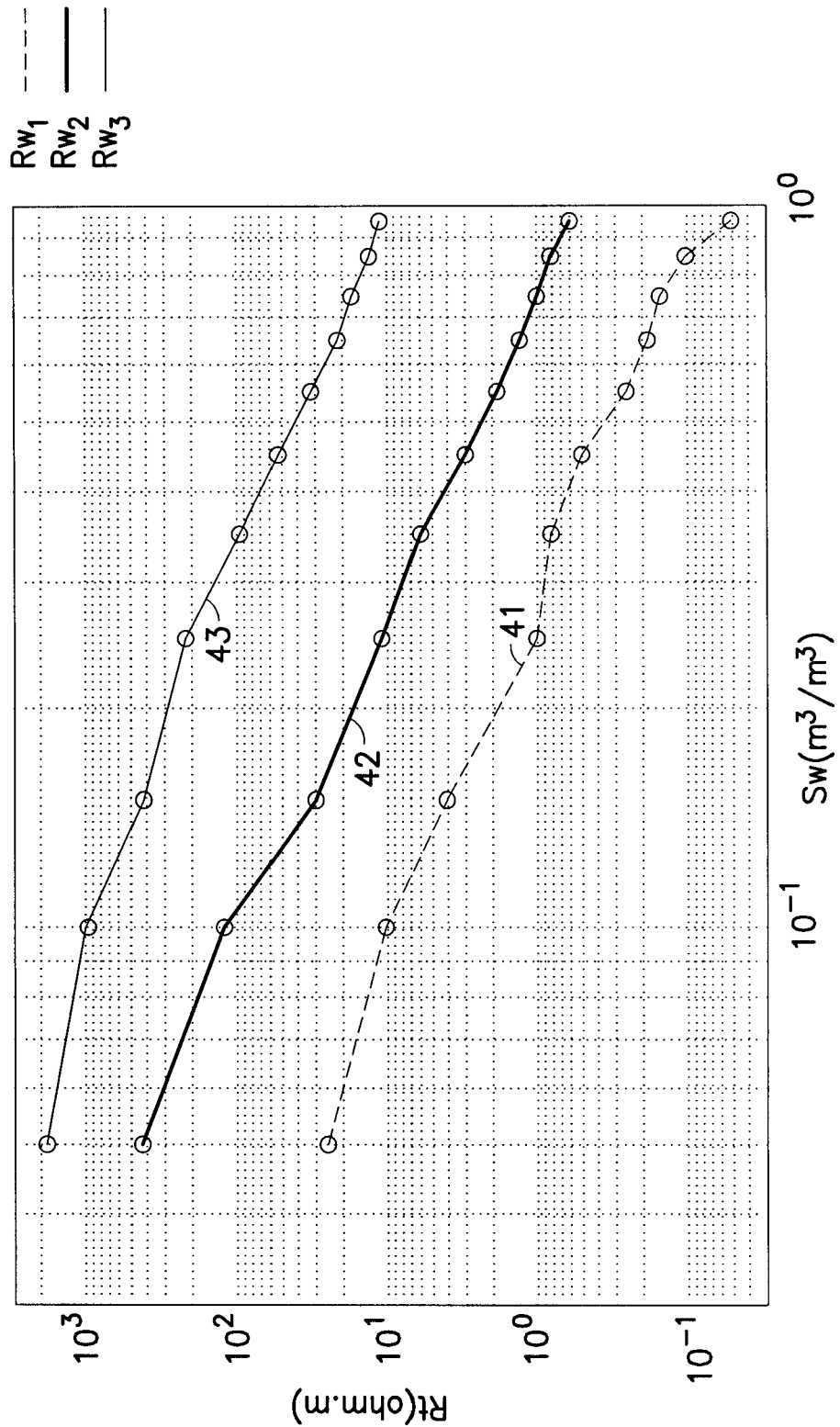
FIG. 4 illustrates a step in accordance with an example of the invention.

In FIG. 4 there are shown the three true resistivity Rt curves 41, 42, 43 that can be obtained when flooding a core of known porosity with brines of three controlled values of resistivity Rw. As a result of this or equivalent graphs, a table (Rt, Rw)→Sw can be constructed that is valid for the porosity value of the core with which the core flooding experiments are conducted. Repeating these experiments for cores of various porosity values from the reservoir under investigation, the table can be extended resulting a plurality of numerical values which link a set of values (Rt, $\phi$, Rw) to a corresponding value of $Sw^R$. Using interpolation between the values given in the experimental table can be used instead of an analytically defined functional relationship.

The above steps are part of a loop which at each iteration determines the mismatch between the two water saturation distributions $Sw^E$ and $Sw^R$ by some form of measure, e.g. the square of the differences or other standard error measures. If the mismatch is higher than a pre-defined threshold, the parameterization of the static model is modified. The parameters changed are typically those with the highest gradient as calculated by reservoir simulator.

In the example, the above Steps 1-3 are repeated until the $Sw^E$ and $Sw^R$ distributions have converged such that their mismatch is lower than the threshold. At this stage the above method can be used to define a final or best estimate of the static reservoir model, i.e. the model as defined by its parameterization in the last iteration of the loop. And a final or best water saturation distribution can be defined as an average of $Sw^E$ and $Sw^R$ (e.g. $(Sw^E+Sw^R)/2$), where the saturation values are taken from the last iteration.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative processes, one skilled in the art will recognize that the system may be embodied using a variety of specific procedures and equipment and could be performed to evaluate widely different types of applications and associated geological intervals. Accordingly, the invention should not be viewed as limited except by the scope of the appended claims.

What is claimed is:

1. A computer-implemented method for determining water saturation within a subterranean reservoir by transforming a deep-reading formation resistivity measurement from a resistivity measuring instrument having at least one receiver coil in a reservoir, said method including the steps of:
    estimating with a reservoir simulator process a spatial distribution of a parameter related to water conductivity at locations beyond an immediate vicinity of wells within said reservoir;
    combining said spatial distribution of said parameter related to the water conductivity with a spatial distribution of resistivity as obtained from said deep-reading formation resistivity measurement from the resistivity measuring instrument;
    deriving a spatial distribution of water saturations at said locations beyond said immediate vicinity of wells;
    obtaining a first water saturation distribution derived from simulation of the reservoir using reservoir parameters estimated from prior knowledge of the reservoir;
    obtaining a second water saturation distribution derived from the deep-reading resistivity measurement using inversion parameters;
    repeating the step of obtaining said first water saturation after changing one or more of said reservoir or inversion parameters until said first and second water saturation distribution converge within a predefined tolerance; and
    wherein the simulation is used to obtain the first water saturation distribution and a water salinity or conductivity distribution.

2. The method of claim 1, wherein the immediate vicinity of wells is defined as a location less than 5 meters from a well.

3. The method of claim 1, wherein the immediate vicinity of wells is defined as a location less than 10 meters from a well.

4. The method of claim 1, wherein the spatial distribution of said parameter related to the water conductivity is estimated using an estimated distribution of connate water and injected water in the reservoir.

5. The method of claim 4, wherein the estimated distribution of connate water and injected water in the reservoir is derived from a simulation of the flow of injected water into the reservoir, said simulation being designed to represent said distribution of connate water and injected water at a time of the deep-reading resistivity measurement.

6. The method of claim 4, wherein the spatial distribution of said parameter related to the water conductivity includes locations where said parameter is estimated assuming a process representing the intrusion of water of a first or injected water salinity into a pore space at least partially filled with water of a second or connate water salinity.

7. The method of claim 4, wherein the estimated distribution of connate water and injected water in the reservoir is derived from a simulation of the flow of injected water into the reservoir, said simulation being designed to represent said distribution of connate water and injected water at a time of the deep-reading resistivity measurement and further including a simulated process representing the intrusion of water of a first or injected water salinity into a pore space at least partially filled with water of a second or connate salinity.

8. The method of claim 1, wherein the reservoir parameters include production and/or injection data.

9. The method of claim 1 wherein the reservoir parameters include the salinity of water injected into the reservoir.

10. The method of claim 1, wherein the simulation is used to obtain a water salinity or conductivity distribution and said water salinity or conductivity distribution is used as inversion parameter to obtain the second water saturation.

11. The method of claim 1, using an Archie-type or Waxman-Smits type relation to derive the second water saturation distribution.

12. The method of claim 1, using a relation gained from measurements on reservoir rock of the reservoir under investigation to derive the second water saturation distribution.

13. The method of claim 1, wherein the one or more of said reservoir or inversion parameters to be changed are determined by the sensitivity of the simulation to changes of said reservoir or inversion parameters.

* * * * *